US012450771B2

(12) United States Patent
Dubbelman et al.

(10) Patent No.: US 12,450,771 B2
(45) Date of Patent: Oct. 21, 2025

(54) SYSTEM AND METHOD FOR LOAD-CARRIER POSE ESTIMATION

(71) Applicant: Avular Holding B.V., Eindhoven (NL)

(72) Inventors: Gijs Dubbelman, Eindhoven (NL); Jonathan Broere, Eindhoven (NL); Guus Engels, Eindhoven (NL)

(73) Assignee: Avular Holding B.V., Eindhoven (NL)

( * ) Notice: Subject to any disclaimer, the term of this patent is extended or adjusted under 35 U.S.C. 154(b) by 388 days.

(21) Appl. No.: 17/886,839

(22) Filed: Aug. 12, 2022

(65) Prior Publication Data

US 2023/0410360 A1 Dec. 21, 2023

(30) Foreign Application Priority Data

Jun. 15, 2022 (NL) ..................................... 2032176

(51) Int. Cl.
*G06T 7/73* (2017.01)

(52) U.S. Cl.
CPC ...... *G06T 7/74* (2017.01); *G06T 2207/10028* (2013.01); *G06T 2207/20081* (2013.01); *G06T 2207/20084* (2013.01); *G06T 2207/30268* (2013.01)

(58) Field of Classification Search
CPC ............ G06T 7/74; G06T 2207/10028; G06T 2207/20081; G06T 2207/20084; G06T 2207/30268
See application file for complete search history.

(56) References Cited

U.S. PATENT DOCUMENTS 10,311,833 B1 * 6/2019 Qiu .................. G09G 5/003

FOREIGN PATENT DOCUMENTS

| EP | 3284712 A1 * | 2/2018 | ............. B66F 9/063 |
| JP | 2022039382 A * | 3/2022 | |
| WO | WO-2023157443 A1 * | 8/2023 | |

OTHER PUBLICATIONS

English translation of WO-2023157443-A1. (Year: 2023).*
English translation of JP-2022039382-A. (Year: 2022).*
Holz, Dirk, "Fast Edge-Based Detection and Localization of Transport Boxes and Pallets in RGB-D Images for Mobile Robot Bin Picking", 47th International Symposium on Robotics (ISR), Munich, Germany, 2016, 1-9.
Iinuma, Ryosuke, et al., "Pallet Detection and Estimation for Fork Insertion with RGB-D Camera", IEEE International Conference on Mechatronics and Automation )ICMA), 2021, 1.

(Continued)

*Primary Examiner* — Thomas D Lee
(74) *Attorney, Agent, or Firm* — Peacock Law P.C.; Justin R. Muehlmeyer

(57) ABSTRACT

A system for Load-carrier Pose estimation. The system includes a Load-carrier for supporting a load with Load-carrier handling indicators or Key-points, and a driving vehicle. The Pose represents a relative position and orientation of the Load-carrier with reference to the vehicle. The system includes a 2D sensor and a 3D sensor. The system is arranged to detect 2D Keypoints in images of the Load-carrier obtained with the 2D sensor, and to match these 2D Keypoints with 3D data captured with the 3D sensor to establish a 3D position and orientation of the detected Keypoints.

19 Claims, 5 Drawing Sheets

(56) References Cited

OTHER PUBLICATIONS

Iinuma, Ryosuke, et al., "Robotic Forklift for Stacking Multiple Pallets with RGB-D Cameras", Journal of Robotics and Mechatronics, VI. 33, No. 6, 1265-1273, 2021.
Li, Yongyao, et al., "Pallet Localization Techniques of Forklift Robot: A Review of Recent Progress", Journal of Robotics and Mechanical Engineering, vol. 1, Issue 1, 2022, 1-7.
Xiao, Junhao, et al., "Pallet recognition and localization using an RGB-D camera", International Journal of Advanced Robotic Systems, Nov.-Dec. 2017, 1-10.
Alatise, Mary B., et al., "Pose Estimation of a Mobile Robot Based on Fusion of IMU Data and Vision Data Using an Extended Kalman Filter", Sensors, vol. 17, No. 10, 2017, 2164.
Chen, Mengxiao, et al., "cReal-time 3D Mapping using a 2D Laser Scanner and IMU-aided Visual SLAM", 2017 IEEE International Conference On Real-Time Computing and Robotics (RCAR), IEEE, 2017, 297-302.
Dill, Evan, "Integration of 3D and 2D Imaging Data for Assured Navigation in Unknown Environments", IEEE/ION Position, Location and Navigation Symposium, Indian Wells, CA, USA, 2010, 285-294.
Sahin, Caner, et al., "A Review on Object Pose Recovery: from 3D Bounding Box Detectors to Full 6D Pose Estimators", arXiv:2001.10609v2, 2020, 1-25.
Walter, Matthew R., et al., "A Situationally Aware Voice-commandable Robotic Forklift Working Alongside People in Unstructured Outdoor Environments", Journal of Field Robotics, vol. 32, No. 4, 2015, 590-628.
Walter, Matthew R., "Appearance-based object reacquisition for mobile manipulation", Computer Vision and Pattern Recognition Workshops (CVPRW), 2010 IEEE Computer Society Conference on, IEEE, Piscataway, NJ, USA, 2010, 1-8.

\* cited by examiner

SYSTEM AND METHOD FOR LOAD-CARRIER POSE ESTIMATION

CROSS-REFERENCE TO RELATED APPLICATIONS

This application claims priority to and the benefit of Netherland Patent Application No. 2032176, titled "System and Method for Load-Carrier Pose Estimation", filed on Jun. 15, 2022, and the specification and claims thereof are incorporated herein by reference.

BACKGROUND OF THE INVENTION

Field of the Invention

The invention relates to a system and method for Load-carrier Pose estimation, said system comprising a Load-carrier for supporting a load, wherein the Load-carrier is provided with Load-carrier handling indicators or Key-points, and a driving vehicle, wherein said Pose represents a relative position and orientation of the Load-carrier with reference to the vehicle, said system further comprising a 2D sensor and a 3D sensor.

The current state-of-the-art Load-carrier Pose estimation systems can be differentiated by the type of sensors that are used to detect the Load-carrier and determine its Pose. Used sensors in the prior art range from 2D, 2.5D, and 3D lidars, cameras, depth cameras, and combinations of these. Although all systems serve a similar purpose, each type of sensor (or combination of sensors) requires specific and tailored processing steps and, as such, the state-of-the-art can be differentiated by the type of sensor (or combination of sensors) being used.

The processing steps of state-of-the-art systems (see ref. 1-5) utilizing sensors can be characterized by two main processing steps:
  Load-carrier detection: In the first step, the Load-carrier is detected using computer vision techniques using 2D sensor data (i.e. from a camera). Typically, this involves using a bounding box object detector or semantic segmentation utilizing Machine Learning (e.g. deep artificial neural networks) that are trained on big data.
  Load-carrier Pose estimation: After the Load-carrier is found in the 2D sensor data, its detection is transferred to the 3D sensor data (i.e. depth camera), to differentiate between 3D data points belonging to the Load-carrier and 3D data points belonging to other objects or background. After this, typically a template or some other sort of prior information on the Load-carrier is matched to the Load-carrier 3D data points, to derive the Pose of the Load-carrier.

Reference or discussion of references cited in the present application is given for more complete background and is not to be construed as an admission that such publications are prior art for purposes of patentability determination.

BRIEF SUMMARY OF THE INVENTION

Embodiments of the present invention achieve the following advantages in comparison with existing art for determining the Pose of Load-carriers:
  1. To enable the Pose estimation of Load-carriers from a wider range;
  2. To enable the Pose estimation of Load-carriers from more oblique observation angles;
  3. To secure the unique detection of a single Load-carrier among multiple Load-carriers.
  4. To enable that the system operates while there is relative motion between the vehicle and the Load-carrier.

In terms of vehicle operation, embodiments of the present invention enable more flexibility in Load handling vehicle manoeuvring during its operation and thus reduces the necessity for more rigid/fixed positioning systems.

These objects and advantages are achieved with a system and method for Load-carrier Pose estimation having the features of one or more of the appended claims.

One embodiment of the present invention is directed to a system for Load-carrier Pose estimation, comprising a Load-carrier for supporting a load, wherein the Load-carrier is provided with Load-carrier handling indicators or Key-points, and a driving vehicle, wherein said Pose represents a relative position and orientation of the Load-carrier with reference to the vehicle, said system further comprising a 2D sensor and a 3D sensor, wherein the system is arranged to carry out a first estimation phase in which a Load-carrier detection is carried out, followed by a second estimation phase wherein a Pose estimation is applied, and wherein the second estimation phase is embodied with 2D Keypoint detection and 3D matching of such 2D Keypoints.

Preferably the system is arranged to detect 2D Key-points in images of the Load-carrier obtained with the 2D sensor, and to match these 2D Keypoints with 3D data captured with the 3D sensor to establish a 3D position and orientation of the detected Keypoints.

The system thus detects 2D Keypoints (Load-carrier handling indicators) which represent a known local coordinate system (for example the Pallet blocks of a Euro Pallet) of a movable Load-carrier in an image captured by a 2D imaging system (e.g., camera or device that capture high-resolution intensity maps of electromagnetic radiation) and matches those Keypoints to 3D data captured by a 3D measurement system (e.g., a LiDAR, Stereo Vision, ToF, Structured Light sensor, etc.).

It is further preferred that in a third estimation phase the system employs Pose estimation using 3D template matching initialized by the Pose estimation resulting from the second phase.

It is preferred that the 3D position and orientation of the detected Keypoints of the carrier in the place for a final alignment is supplied to a processor of the system that carries out the 3D template matching optimization.

Advantageously the 3D position and orientation of the detected Keypoints is supplied to a processor of the system that carries out the 3D template matching optimization wherein the position and orientation of the Load-carrier is established with high accuracy.

To carry out the 3D template matching optimization the system preferably comprises a 3D point cloud template of the Load-carrier, wherein the system is arranged to superimpose this template onto 3D data derived with the 3D sensor, which 3D data represents the Load-carrier in 3D space, and wherein said superposition enables computing the Load-carrier's position.

Advantageously the 2D sensor and/or the 3D sensor are mounted on the vehicle, thus providing said sensors with a fixed 6 degrees of freedom offset for use in a 2D to 3D coordinate matrix transformation. This coordinate matrix transformation is used in the matching operation on the 2D data with reference to the 3D data.

In some embodiments it may be desirable that the system comprises an IMU sensor.

It is preferable that the system operates in real-time which enables to estimate the Pose at least once while the vehicle is moving.

Preferably the system is provided with an image processor connected to the 2D sensor for detecting the Load-carrier and the 2D Keypoints which generates image data at a frequency of more than 30 Hz. This promotes the effective real-time operation of the system.

Suitably the image processor detects the Load-carrier and the 2D Keypoints using machine learning/deep learning.

In an embodiment it is found that the accuracy of the Pose estimation is promoted when the image processor combines the detection of the 2D Keypoints with Load-carrier detection.

In one embodiment, the image processor detects the Load-carrier and the 2D Keypoints using machine learning/deep learning, preferably by applying the same deep neural network for detecting the Load-carrier and the 2D Keypoints simultaneously. This has the benefit that the simultaneous detection allows to apply extra filtering steps, for instance based on the fact that there cannot be Keypoints outside the bounding box of the Load-carrier detection.

Embodiments of the present invention may be applied with any combination of Load-carrier and vehicle. Particularly favorable results are achieved when the Load-carrier is a pallet, in particular a euro pallet. In that case it is also beneficial that the vehicle is a pallet lifter, in particular a forklift.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

The following description relates to approaching, detecting and moving a euro pallet with a forklift. The invention is explicitly not restricted to this specific example, which is provided as a clear and illustrative description of the results that are achievable with the invention.

The sensors and system according to the present invention are preferably mounted on a vehicle that is transporting loads in, for example, a warehouse or port area. Examples of vehicles are a forklift, pallet Lifter, Automated Guided Vehicle (AGV) or Autonomous Mobile Robot (AMR). The loads are expected to be carried by a Load-carrier, e.g, a pallet. The system estimates the relative position, referred to as Pose, of the Load-carrier to the vehicle. The Pose output can then be used to guide the vehicle towards the Load-carrier from a far range (10 m) and with high accuracy (+/−1 cm).

Figure 1:
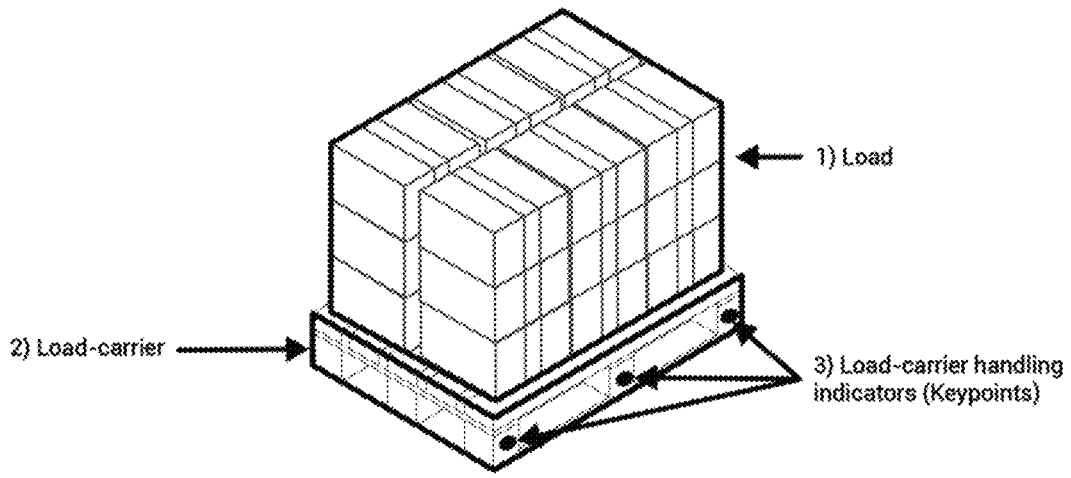
FIG. 1 is an illustration from a perspective view showing a Load-carrier supporting a load.

Definitions (see FIG. 1)
1) Load (1): The goods that are transported by the Load-carrier.
2) Load-carrier (2): The object (e.g. pallet) on which the Load is transported.
3) Load-carrier handling indicators (3): The points on the Load-carrier that are indicative of where the Load-carrier should be handled by the vehicle (e.g. pallet blocks).
4) Keypoints: Used as a synonym for Load-carrier handling indicators.
5) Pose: The relative position and orientation of the Load-carrier with reference to the vehicle.

Figure 2:
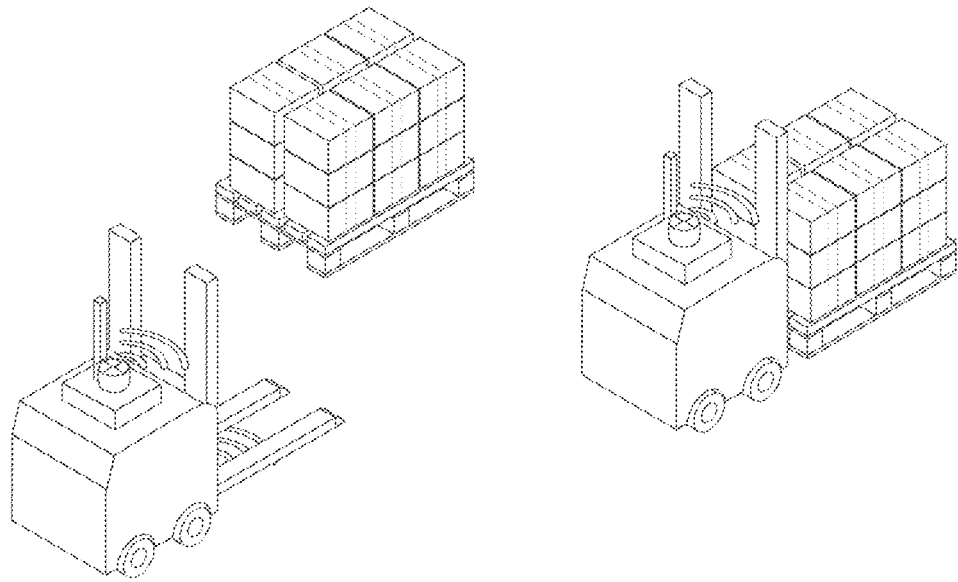
FIG. 2 is an illustration from a perspective view showing positioning and moving a forklift towards a euro pallet.

With reference to FIG. 2, the implementation is shown of positioning and moving a Fork-Lift towards a Euro pallet with a load. Furthermore, the implemented solution computes the vehicle path needed to be followed to reach the Load-carrier, and subsequently computes and communicates target velocity and steering angles to a 'general purpose' vehicle motion control system of the Fork-Lift. In this implementation we have used a RealSense Stereo 3D depth camera. The RealSense unit combines an active stereo-vision setup with an RGB camera for imaging (i.e., it contains three cameras and a pattern projector). The implemented solution makes use of a general-purpose PC for image processing and data processing.

Embodiments of the present invention enable accurate measurement of the Pose between the vehicle and the Load-carrier by first estimating the initial Load-carrier Pose using a combination of Machine Learning for Load-carrier detection and Load-carrier handling indicator detection (Keypoints) in 2D image data and relating this to 3D depth data, to finally use this initial Pose to initialize a more accurate '3D template matching optimization procedure' (e.g. Iterative Closest Point or ICP).

Compared to traditional art for determining the Pose of Load-carriers, embodiments of the invention present enable:
1. The Pose estimation of Load-carriers from a wider range;
2. The Pose estimation of Load-carriers from more oblique observation angles;
3. The unique detection of Load-carrier (Euro Pallets in particular) when Load-carriers are placed adjacently. The prior art solutions cannot robustly distinguish a pallet block or pocket from pockets/blocks formed between two unique pallets next to each other.

4. The system operates while there is relative motion between the vehicle and the Load-carrier.

In terms of vehicle operation, this enables more flexibility in Load handling vehicle manoeuvring during its operation and thus reduces the necessity for more rigid/fixed positioning systems.

Embodiments of the present invention preferably use a combination of a 2D sensor (e.g. a camera) and a 3D sensor (e.g., a 3D LiDAR or depth/stereo camera).

A system of the present invention preferably estimates the Pose (position and orientation) of the Load-carrier to navigate/move the vehicle towards the position of the Load-carrier (e.g., Euro-Pallet). In particular, it preferably does so by combining/fusing real-time object and Keypoint detections from 2D (e.g., a camera), 3D sensor (e.g., a LiDAR or Depth/stereo camera) observations and optionally inertial measurement unit ("IMU") data.

In another embodiment, a system of the invention preferably detects 2D Keypoints (Load-carrier handling indicators) which represent a known local coordinate system (for example the Pallet blocks of a Euro Pallet) of a movable Load-carrier in an image captured by a 2D imaging system (e.g., camera or device that capture high-resolution intensity maps of electromagnetic radiation) and matches those Keypoints to 3D data captured by a 3D measurement system (e.g., a LiDAR, Stereo Vision, ToF, Structured Light sensor, etc.).

Further a system of the invention preferably uses the 3D position and orientation of the detected Keypoints to initialize the iterations of a real-time 3D template matching optimization method (e.g., ICP). This will be explained in more detail in the following section.

A system of the invention preferably comprises a 2D camera sensor, generating 2D images of its field of view, a 3D depth sensor (e.g., a LiDAR, ToF Sensor, Stereo Vision Depth Sensor, Structured Light Sensor, Radar, Sonar etc.) generating a 3D point cloud of its field of view, and a processing unit capable of real-time processing of the sensor data. In certain embodiment of the invention, an IMU can be used to transform the data of the 2D and 3D sensors into a common coordinate reference system. The IMU can also transform sensor observations to be in a levelled (gravity) reference system.

The 2D and 3D sensors preferably comprise a mutually fixed six degree-of-freedom ("6 DoF") off-set (they are preferably co-mounted onto a vehicle). This means that the data from the 2D and 3D sensors can be aligned (correlated) using 2D and 3D 'camera matrix transformations'. In other words, it becomes possible to compute the location of an image feature (e.g., the blocks of a Euro Pallet) from the 2D sensor in the 3D data, and vice versa (e.g., being the spatial coordinates of the pallet blocks).

Figure 3:
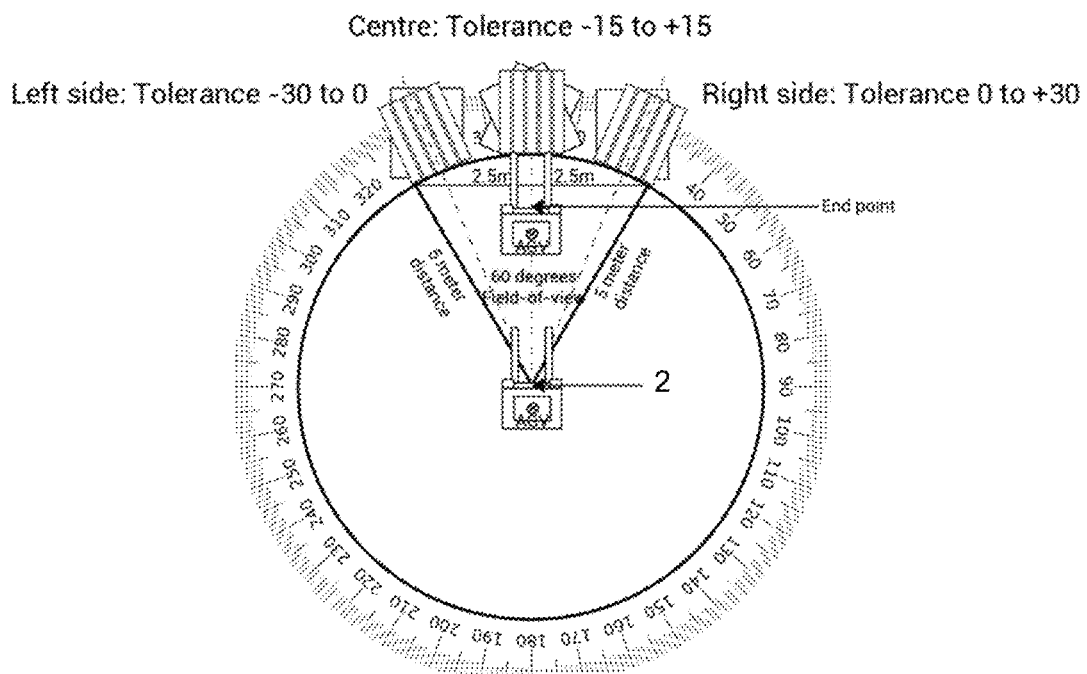
FIG. 3 is a schematic illustration from a top view showing an operational range of a system according to an embodiment of the present invention.

The combination of a high-resolution 2D image processor, a 3D sensor, and optionally an IMU) with a real-time processing unit makes it possible to dynamically (while moving) estimate the Pose of a Load-carrier at a much wider range (distance between vehicle and Load-carrier) and from more oblique viewpoints (approaching angles of vehicle with reference to Load-carrier) than prior art solutions, as illustrated in FIG. 3 for example.

Figure 4:
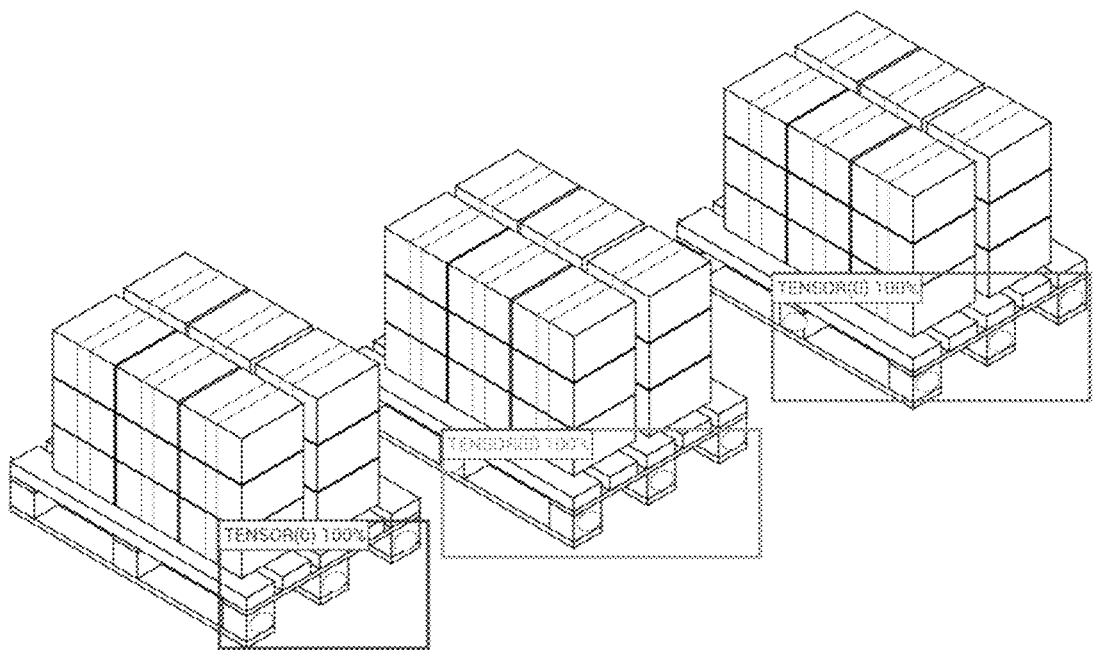
FIG. 4 is an illustration from a perspective view showing an example of automatic detection of a Load-carrier and Keypoints.

Pose Estimation Using Load-Carrier Detection, Keypoint Detection, and 3D Matching Embodiments of the present invention preferably process data according to the following real-time workflow: The 2D image processor generates image data at a high frequency (>30 Hz) from which the processing unit is detecting the Load-carrier (e.g., A Euro Pallet or similar) as well as the Keypoints of the Load-carrier (e.g., the pallet blocks), as illustrated in step one (1) of the process of FIG. 6 representing an overview of the Algorithm workflow, and FIG. 4.

The detection is preferably done using machine learning/deep learning. According to an embodiment of the present invention, the Keypoint detection, which is important for successive processing steps, is made more robust by combining it with the Load-carrier detection. The Load-carrier detection can operate at much greater distances and thus allows aligning the vehicle towards the Load-carrier, while the Keypoints are not yet necessarily found. Once better aligned, the key point detector can work more accurately to enable the next steps in processing. This is reflected in step two (2) of FIG. 6.

Figure 5:
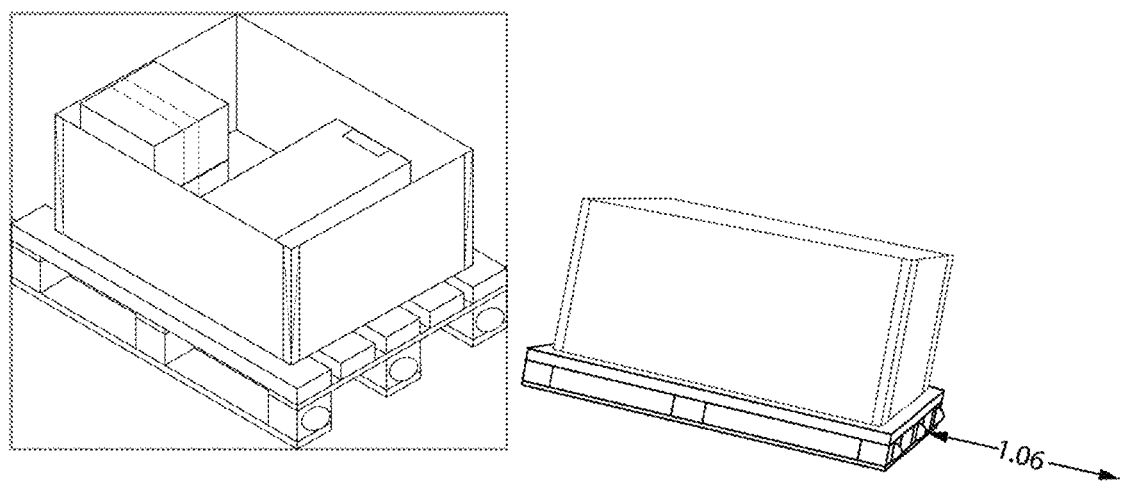
FIG. 5 is an illustration from a perspective view showing key point detections aligned and matched in 3D data.
Figure 6:
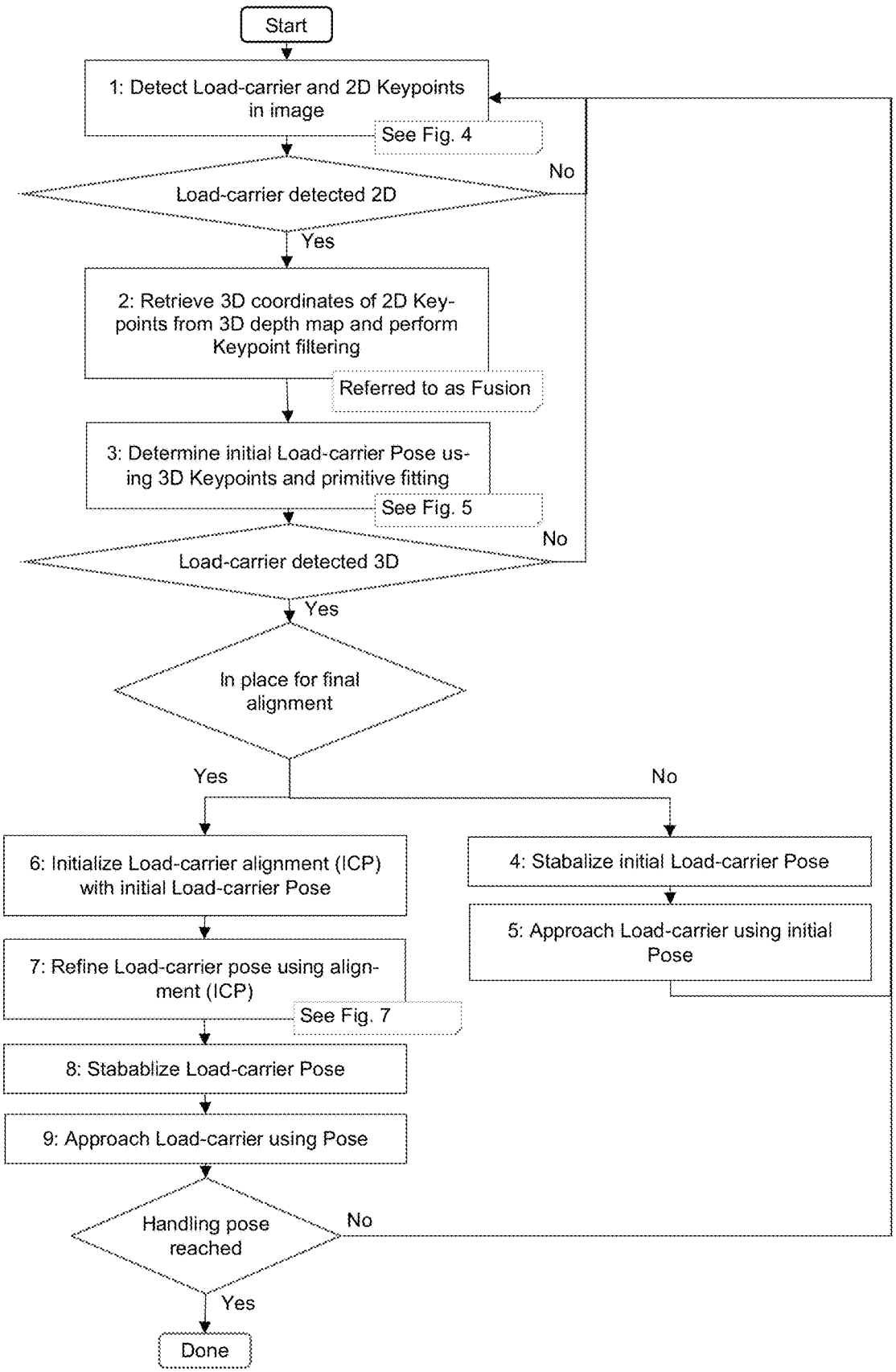
FIG. 6 is a flow chart showing an algorithmic process representing an operation of a system according to an embodiment of the present invention.

Once detected, step three (3) of FIG. 6 depicts that the Keypoints of the Load-carrier are then related to the 3D data of the features using the 2D to 3D transformation matrixes through the fixed 6 DoF offset, see also FIG. 5. In particular, for the Euro-Pallet case, the position of the pallet is found by fitting a line in 3D space through the 3D Keypoints in the point cloud representing the three frontmost pallet blocks, as shown in FIG. 5. The combination or fusion of observations from the 2D camera and 3D sensor is the enabling feature.

Pose Estimation Using 3D Template Matching Initialized by Key Point Detection and 3D Matching In connection with steps 6, 7, 8 and 9 of the algorithm shown in FIG. 6, the following elucidation describes the actions taking place in these steps, using the result of the initial Load-carrier Pose as derived in step 3 of the algorithm shown in FIG. 6.

Figure 7:
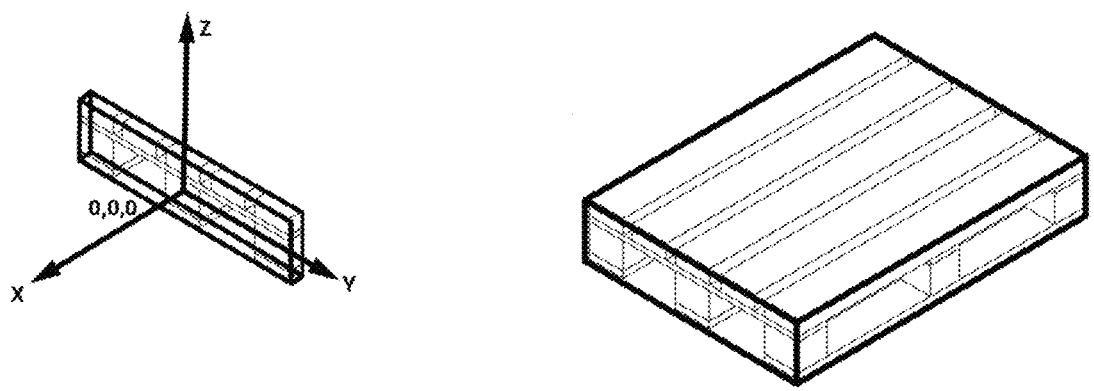
FIG. 7 is an illustration from a perspective view showing a 3D illustration of a euro pallet and a corresponding 3D point cloud model of the euro pallet.

Since the geometry and the dimensions of the Load-carrier and its Keypoints are known from standards and drawings the Load-carrier is represented as a 3D point cloud template, a-priori, see step 7 of FIG. 6 and FIG. 7. As the 3D sensor is detecting the point cloud of the Load-carrier, the position of the Load-carrier can be computed by superimposing the template onto the detected Load-carrier in 3D space. In other words, finding the position of the template by minimizing the overlap (defined by some distance metric) between template 3D points and detected 3D points.

The iterative optimization process used in the current implementation is referred to as Iterative Closest Point (ICP). The ICP is used in the close range of the sensor to the pallet and its purpose is to refine the Pose estimate towards the most accurate representation. To have this work robustly, precise, and accurate it is desirable to initialize, see step 6 of FIG. 6, the optimization iteration at a Pose state which is close to the minimum and consistent with the retrieval of the 3D the points based on the 2D sensor data as reflected by steps 2 and 3 of the algorithm of FIG. 6 (i.e., overlapping with the detections). This initial Pose is thus determined by the 2D key point detector and 3D matching described in the above. Again, the combination or fusion of observations from the 2D camera and 3D sensor to derive the Key-points is an important object of the invention.

In summary, by combining the two sensor modalities (3D and 2D imaging) it is possible to balance the range versus accuracy of the 3D Pose estimation of the Load-carrier since, when using either of these sensor modalities alone, one would have to trade in operating range for improved accuracy or vice versa. The imaging sensor is well suited for 'perception' or object-classification due to its rich information density (e.g., colour information and spatial resolution) and therefore it enables the detection of a Load-carrier and Key-points at longer ranges. The 3D sensor on the other hand can determine the scale, position and orientation of objects relative to their origin and needs the richer 2D image data for either providing the 3D pose of features in the image or for 'template matching initialization'.

Embodiments of the present invention can include every combination of features that are disclosed herein independently from each other. Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited herein are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Optionally, embodiments of the present invention can include a general or specific purpose computer or distributed system programmed with computer software implementing steps described above, which computer software may be in any appropriate computer language, including but not limited to C++, CUDA, FORTRAN, ALGOL, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

REFERENCES (1) Yongyao Li et al., "Pallet Localization Techniques of Forklift Robot: A Review of Recent Progress", Journal of Robotics and Mechanical Engineering, vol. 1, issue 2, 2021.
(2) Junhao Xiao et al., "Pallet recognition and localization using an RGB-D camera", International Journal of Advanced Robotic Systems, 2017.
(3) Ryosuke Iinuma et al, "Pallet Detection and Estimation for Fork Insertion with RGB-D Camera", Proceedings of 2021 IEEE International Conference on Mechatronics and Automation August 8-11, Takamatsu, Japan, 2021.
(4) Ryosuke Iinuma et al., "Robotic Forklift for Stacking Multiple Pallet with RGB-D Cameras", Journal of Robotics and Mechatronics, vol. 33, issue 6, 2021.
(5) Dirk Holz et al, "Fast Edge-Based Detection and Localization of Transport Boxes and Pallets in RGB-D Images for Mobile Robot Bin Picking", 47th International Symposium on Robotics (ISR), Munich, Germany, June 2016.

The invention claimed is:

1. A system for Load-carrier Pose estimation, the system comprising:
a driving vehicle;
a Load-carrier for supporting a load, wherein the Load-carrier comprises Load-carrier handling indicators or Keypoints; and
a 2D sensor and a 3D sensor, wherein the system is arranged to carry out a first estimation phase in which a Load-carrier detection is carried out, followed by a second estimation phase wherein a Pose estimation is applied, the Pose representing a relative position and orientation of the Load-carrier with reference to the vehicle, and wherein the second estimation phase is embodied with 2D key point detection and 3D matching of such 2D Keypoints, and wherein in a third estimation phase the system employs Pose estimation using 3D template matching initialized by the Pose estimation resulting from the second phase.

2. The system according to claim 1, wherein the system is arranged to detect 2D Keypoints in images of the Load-carrier obtained with the 2D sensor, and to match these 2D Keypoints with 3D data captured with the 3D sensor to establish a 3D position and orientation of the detected Keypoints.

3. The system according to claim 1, wherein the 3D position and orientation of the detected Keypoints of the Load-carrier in the place for a final alignment is supplied to a processor of the system that carries out the 3D template matching optimization.

4. The system according to claim 1, wherein the system comprises a 3D point cloud template of the Load-carrier, wherein the system is arranged to superimpose the 3D point cloud template onto 3D data derived with the 3D sensor, which 3D data represents the Load-carrier in 3D space, and wherein said superposition enables computing the Load-carrier's position.

5. The system according to claim 1, wherein the 2D sensor and/or the 3D sensor are mounted on the vehicle, thus providing said sensors with a fixed 6 degrees of freedom offset for use in a 2D to 3D coordinate matrix transformation.

6. The system according to claim 1, further comprising an IMU sensor.

7. The system according to claim 1, wherein the system operates in real-time enabling to estimate the Pose at least once while the vehicle is moving.

8. The system according to claim 1, further comprising an image processor connected to the 2D sensor for detecting the Load-carrier and/or 2D Keypoints which generates image data at a frequency of more than 30 Hz.

9. The system according to claim 8, wherein the image processor combines the detection of the 2D Key-points with Load-carrier detection.

10. The system according to claim 8, wherein the image processor detects the Load-carrier and the 2D Keypoints using machine learning/deep learning by applying the same deep neural network for detecting the Load-carrier and the 2D Keypoints simultaneously.

11. The system according to claim 1, wherein the Load-carrier is a pallet.

12. The system according to claim 1, wherein the vehicle is a pallet lifter or forklift.

13. A method for Load-carrier Pose estimation of a Load-carrier, wherein the Load-carrier comprises Load-carrier handling indicators or Keypoints, wherein the Pose represents a relative position and orientation of the Load-carrier with reference to a vehicle, the method comprising the steps of:
employing a 2D sensor and a 3D sensor;
executing a first estimation phase in which a Load-carrier detection is carried out;
executing a second estimation phase subsequent to the first estimation phase applying a Pose estimation and employing 2D key point detection and 3D matching of such 2D Keypoints;
providing an image processor connected to the 2D sensor for detecting the Load-carrier and/or the 2D Keypoints which generates image data at a frequency of more than 30 Hz;
arranging that the image processor combines the detection of the 2D Keypoints with Load-carrier detection; and
detecting the 2D Keypoints and the Load-carrier by using the same deep neural network simultaneously.

14. The method according to claim 13 further comprising the steps of:
detecting 2D Key-points in images of the Load-carrier obtained with the 2D sensor; and
matching these 2D Keypoints with 3D data captured with the 3D sensor to establish a 3D position and orientation of the detected Keypoints.

15. The method of claim 13 further comprising the step of executing a third estimation phase employing Pose estimation using 3D template matching initialized by the Pose estimation resulting from the second estimation phase.

16. The method of claim 15 further comprising the step of: providing the 3D position and orientation of the detected Keypoints of the Load-carrier in the place for a final alignment to initialize the 3D template matching optimization.

17. The method of claim 15 further comprising the step of superimposing a template of the Load-carrier onto 3D data derived with the 3D sensor, which 3D data represents the Load-carrier in 3D space, wherein said superposition enables computing the Load-carrier's position.

18. The method according to claim 13 further comprising the step of estimating the Pose while the vehicle is moving.

19. The method according to claim 13, further comprising the step of using the image processor to detect the Load-carrier and/or 2D Keypoints using machine learning/deep learning.

* * * * *